(12) United States Patent
Olschewski

(10) Patent No.: US 7,257,289 B2
(45) Date of Patent: Aug. 14, 2007

(54) SPECTRAL MICROSCOPE AND METHOD FOR DATA ACQUISITION USING A SPECTRAL MICROSCOPE

(75) Inventor: Frank Olschewski, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 296 days.

(21) Appl. No.: 10/250,152

(22) Filed: Jun. 7, 2003

(65) Prior Publication Data

US 2003/0231825 A1 Dec. 18, 2003

(30) Foreign Application Priority Data

Jun. 17, 2002 (DE) ................. 102 27 111

(51) Int. Cl.
*G02B 6/26* (2006.01)
(52) U.S. Cl. ............ 385/27; 250/458.1; 359/389
(58) Field of Classification Search ............ 385/27
See application file for complete search history.

(56) References Cited

U.S. PATENT DOCUMENTS

| | | | |
|---|---|---|---|
| 3,720,822 A | 3/1973 | Rochester et al. | |
| 5,117,466 A * | 5/1992 | Buican et al. | 382/133 |
| 5,751,417 A * | 5/1998 | Uhl | 356/318 |
| 5,791,024 A | 8/1998 | Jovanovich | |
| 6,081,325 A * | 6/2000 | Leslie et al. | 356/237.2 |
| 6,097,870 A * | 8/2000 | Ranka et al. | 385/127 |
| 6,300,639 B1 * | 10/2001 | Wiederhoeft | 250/458.1 |
| 6,483,103 B2 | 11/2002 | Engelhardt et al. | |
| 6,611,643 B2 * | 8/2003 | Birk et al. | 385/33 |
| 6,654,166 B2 * | 11/2003 | Birk et al. | 359/389 |
| 6,654,522 B2 * | 11/2003 | Chandalia et al. | 385/48 |

FOREIGN PATENT DOCUMENTS

| | | |
|---|---|---|
| DE | 4330347 A1 | 3/1995 |
| DE | 19829944 A1 | 1/2000 |
| DE | 10115577 A1 | 12/2001 |
| DE | 10115589 A1 | 12/2001 |

\* cited by examiner

*Primary Examiner*—Nikita Wells
*Assistant Examiner*—Phillip A. Johnston

(57) ABSTRACT

A spectral scanning microscope and a method for data acquisition using a spectral scanning microscope are disclosed. A computer system is provided that encompasses a memory and a database. In combination with the computer system and/or the database, a continuous wavelength sub-region that serves to illuminate the specimen can be selected from a continuous wavelength region using the spectral selection means. Also in combination with the computer system together with the spectral selection means, a detection band can be selected from the detected light beam.

12 Claims, 8 Drawing Sheets

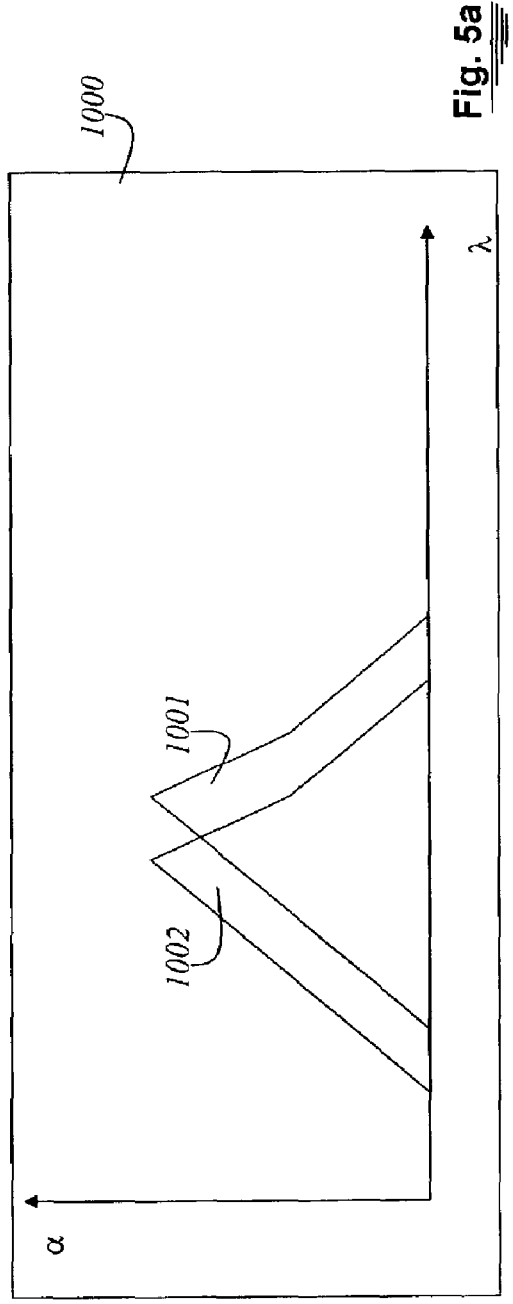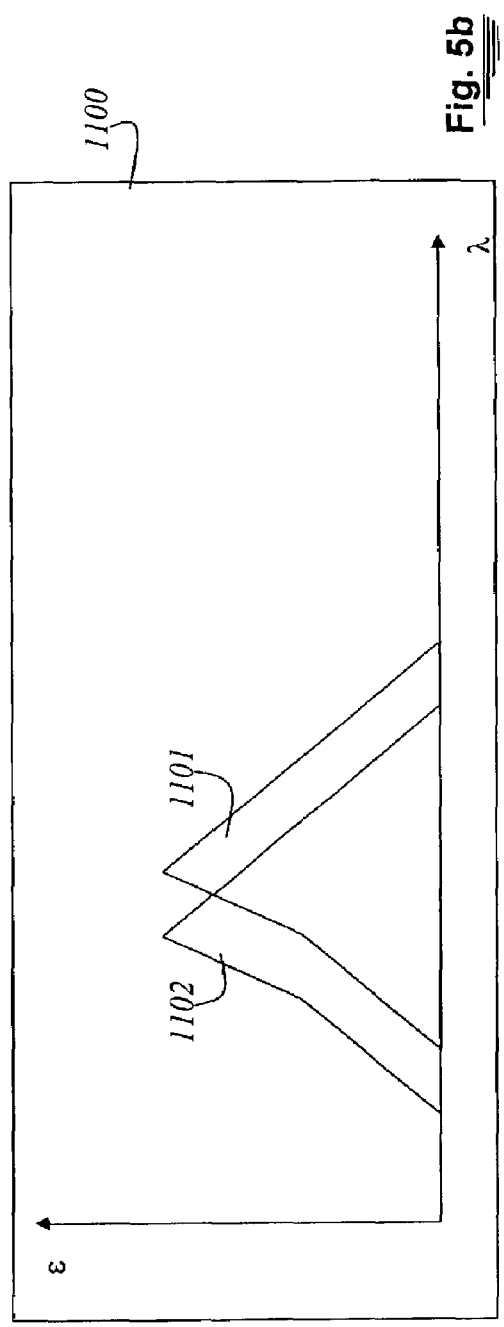

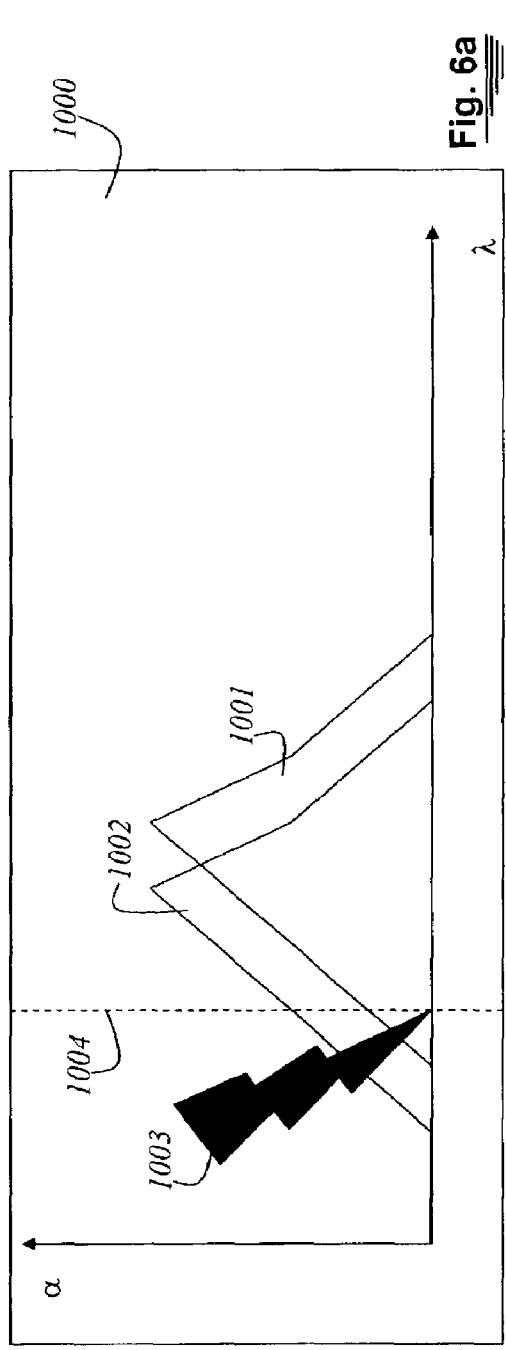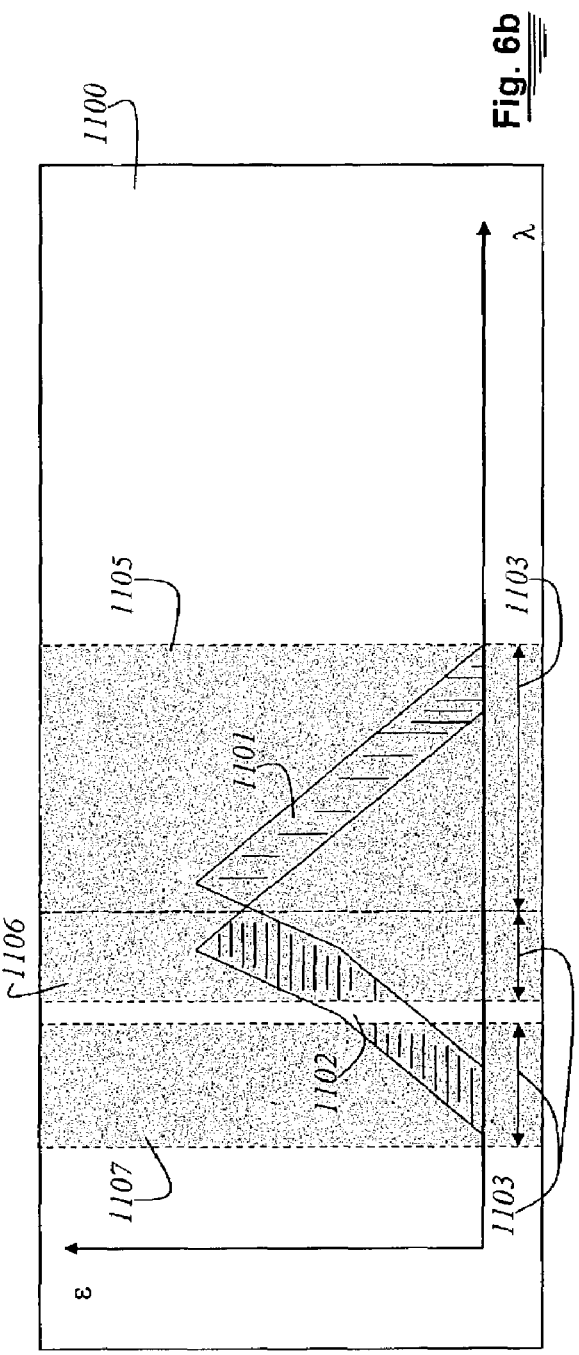

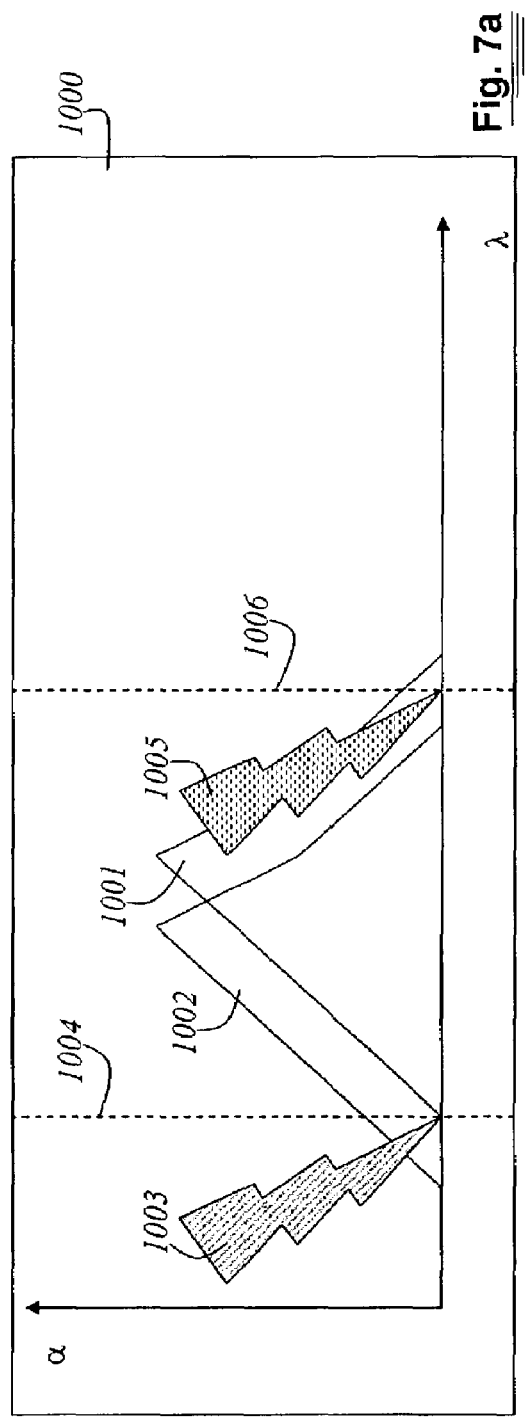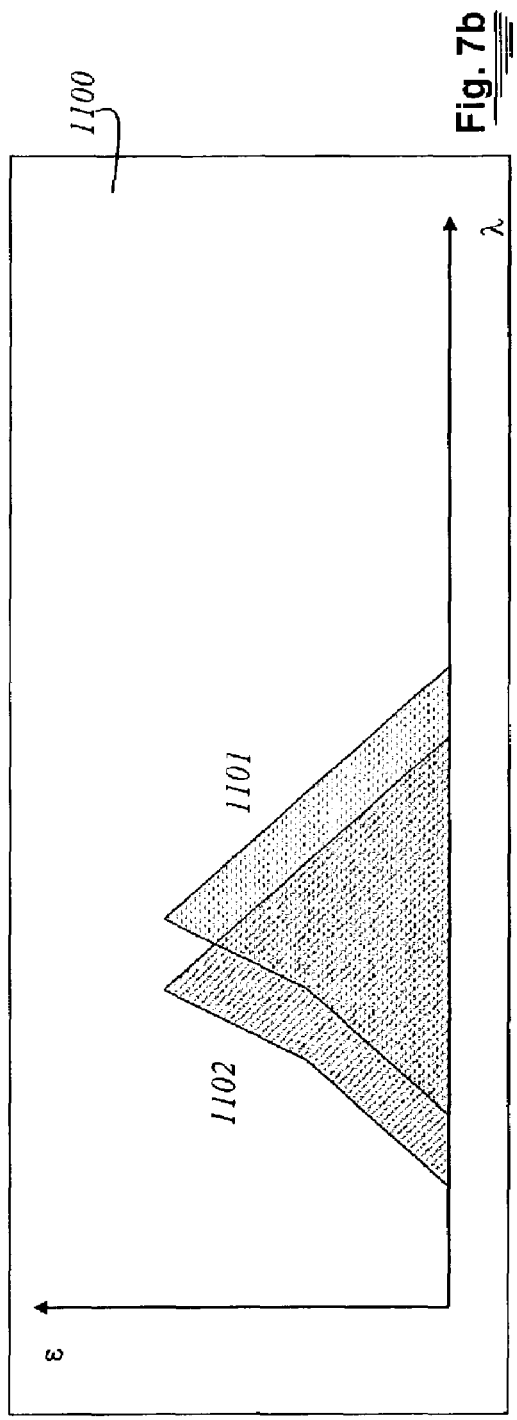

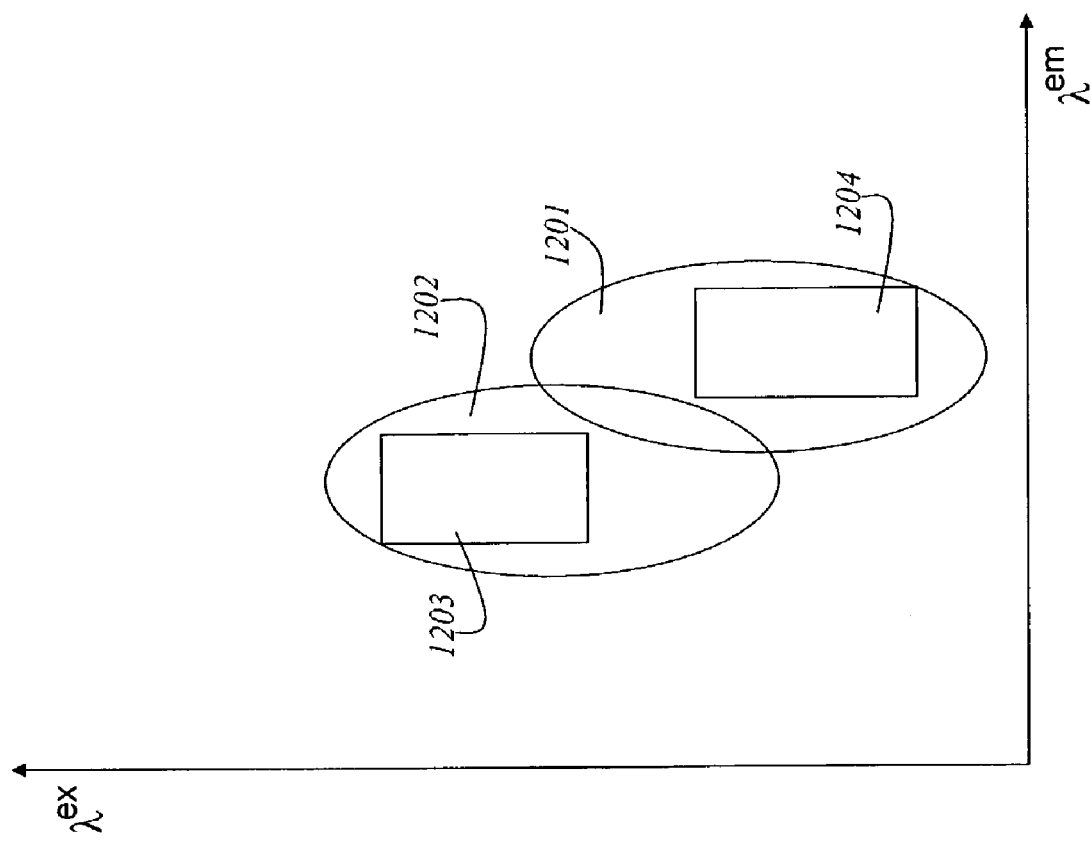

SPECTRAL MICROSCOPE AND METHOD FOR DATA ACQUISITION USING A SPECTRAL MICROSCOPE

CROSS REFERENCE TO RELATED APPLICATIONS

This application claims priority of German patent application DE 102 27 111.9 filed on Jun. 17, 2002, which is incorporated by reference herein.

BACKGROUND OF INVENTION

The invention concerns a method for data acquisition using a spectral microscope. The invention further concerns a spectral microscope.

U.S. Pat. No. 6,097,870 discloses an arrangement for generating a broadband spectrum in the visible and infrared spectral region. The arrangement is based on a microstructured fiber into which the light of a pump laser is coupled. The pump light is widened in the microstructured fiber as a result of nonlinear effects. Photonic band gap material or "photon crystal fibers" or "holey fibers" are also used as microstructured fibers. Embodiments as so-called "hollow fibers" are also known.

Arc lamps are known as broadband light sources, and are used in many fields. U.S. Pat. No. 3,720,822 "XENON PHOTOGRAPHY LIGHT," which discloses a xenon arc lamp for illumination in photography, may be cited here as an example.

German Patent Application DE 100 06 800.6 discloses an apparatus for selecting and detecting at least one spectral region of a spectrally spread light beam (SP module). Provided in the spread-out light beam are selection means which are embodied as slides, so as thereby to direct portions of the spread-out light beam to various detectors. The signals of the detectors are then used for image generation. DE 100 06 800.6 does not disclose actuation of the slides in such a way as to make possible rapid and reliable detection of a specific spectrum.

U.S. Pat. No. 5,791,024 discloses a method for classifying chromosomes. In the detection of chromosome defects, the chromosomes are equipped with five different fluorescing dyes. The chromosomes can be unequivocally classified based on the attachment of the dyes to them. From a comparison with a reference, conclusions can be drawn as to the genetic defects that are present. Since the chromosome emits a characteristic spectrum as a result of the dyes attached to it, an unequivocal determination is thus possible. The method presented here is particularly suitable for determining the spectra of the individual chromosomes, but is not designed for application to fluorescence measurements using a spectral scanning microscope.

SUMMARY OF INVENTION

It is the object of the invention to create a method for acquiring maximum information about a fluorescing microscopic specimen. The object is achieved by way of a method for data acquisition using a spectral scanning microscope, comprising the following steps:

a) generating an illuminating light beam, wherein the generated illuminating light encompassing at least one continuous wavelength region within a spectrum;

b) selecting a continuous wavelength subregion from the continuous wavelength region of the illuminating light;

c) setting a detection unit to a selected wavelength subregion;

d) performing an image or volume acquisition process; and e) processing the acquired image data by means of a data analysis algorithm, and graphically depicting the analyzed data.

A further object of the invention is to create a microscope system for acquiring maximum information about a fluorescing microscopic specimen that is suitable for resolving closely adjacent fluorescence spectra. The object is achieved by way of a spectral scanning microscope comprising:

an illumination system that emits an illuminating light beam, means for a spectral selection of the illuminating light beam, at least one spectrally configurable detector, a computer system, a memory and a database provided in said computer system;

wherein in combination with the computer system and/or the database, a continuous wavelength subregion is selected from a continuous wavelength region using the spectral selection means, in order to illuminate a specimen; and and in combination with the computer system and/or the database, a detection band is selectable from the detected light beam using the spectral selection means.

The advantage of the invention is that with the method for data acquisition using a spectral scanning microscope, an illuminating light beam is generated, the illuminating light that is generated encompassing a continuous wavelength region in the spectrum. A continuous wavelength subregion is selected from the continuous wavelength region of the illuminating light, and is used for illumination of the specimen. It is also necessary to set the detection unit to a selected wavelength subregion for the detected light. Image or volume acquisition processes are performed, and the acquired image data are processed by means of a data analysis algorithm. If applicable, and a graphical depiction of the analyzed data can be accomplished. Selection of a continuous wavelength subregion from the continuous wavelength region of the illuminating light, and setting of the detection unit to the selected wavelength subregion of the detected light, can be performed by the user. Selection of a continuous wavelength subregion from the continuous wavelength region of the illuminating light can likewise be performed by a computer algorithm. In parallel therewith, setting of the detection unit to a selected wavelength subregion can also be performed by a computer algorithm. In order to measure certain configurations of the emission spectrum, a systematic modification of the wavelength subregions employed for illumination is performed. A point, line, image, or volume acquisition process is carried out, and pixel-by-pixel reconstruction of the excitation/emission characteristic $\chi_i(\lambda^{ex}, \lambda^{em})$ is performed. The latter can then be visualized.

The spectral scanning microscope is advantageously equipped with an illumination system that emits an illuminating light beam. A means for spectral selection of the illuminating light beam is provided, and at least one spectrally configurable detector. A computer system that encompasses a memory and a database is connected to the spectral scanning microscope. In combination with the computer system and/or the database, a continuous wavelength subregion is selected from a continuous wavelength region using the spectral selection means. The subregion then serves to illuminate a specimen. Also occurring in combination with the computer system and/or the database is the fact that a detection band is selectable from the detected light beam using the spectral selection means. The illumination system of the spectral scanning microscope is a white-light source. The means for spectral selection is an AOTF. The at least one spectrally configurable detector is an SP module.

BRIEF DESCRIPTION OF DRAWINGS

The subject matter of the invention is depicted schematically in the drawings and described below with reference to the Figures, in which:

FIG. 5a illustrates the absorption spectra of two closely adjacent dyes.

FIG. 5b illustrates the emission spectra of two closely adjacent dyes.

FIG. 6a shows the illumination of spectrally closely adjacent absorption spectra of two dyes.

FIG. 6b shows the acquisition of spectrally closely adjacent emission spectra of two dyes.

FIG. 7a shows illumination of the specimen with a first wavelength and a second wavelength.

FIG. 7b shows the result of a scan of the first and the second emission spectrum.

FIG. 8 shows the different illumination and detection bands for two different dyes within the emission and absorption plane.

DETAILED DESCRIPTION

Figure 1:
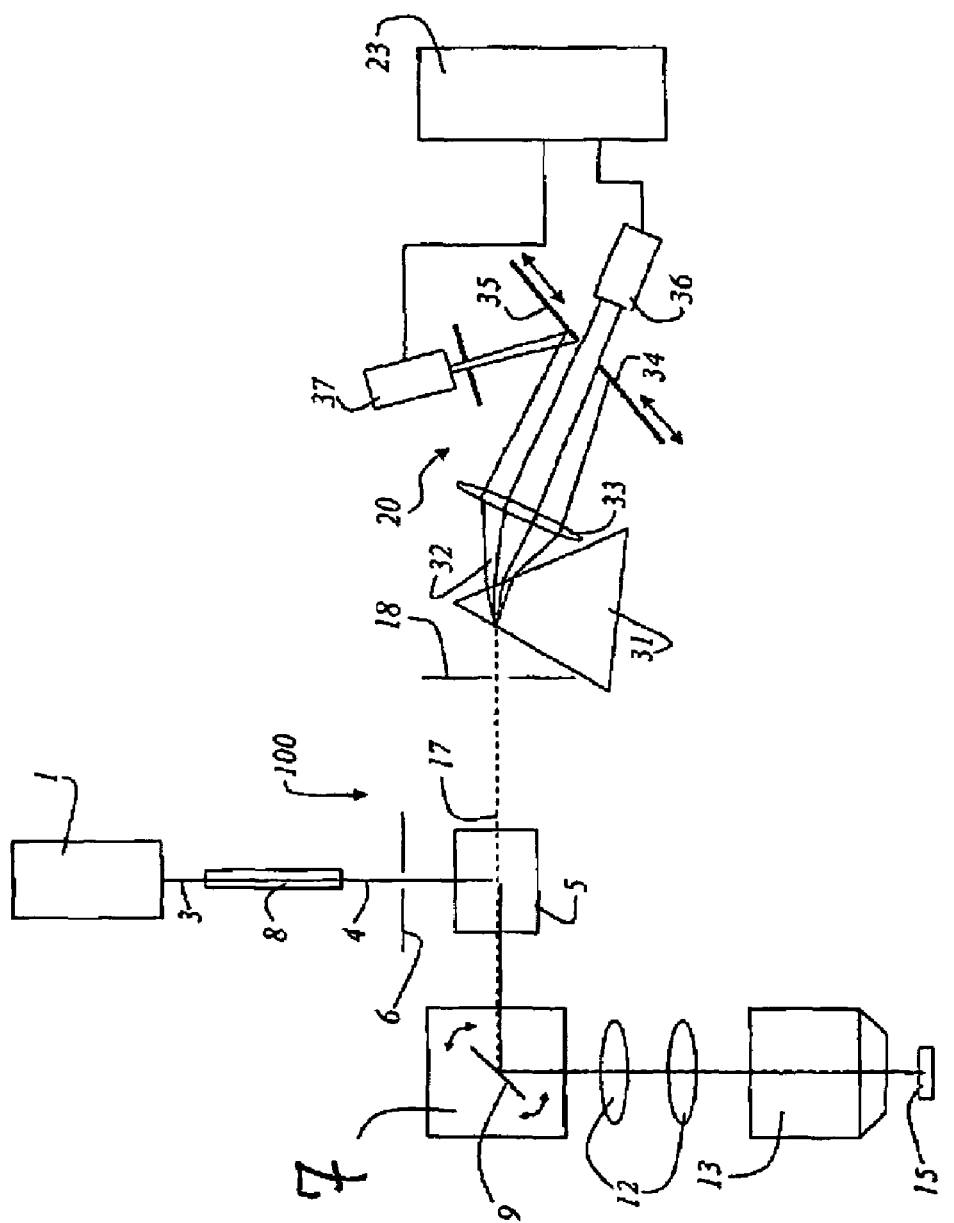
FIG. 1 schematically depicts a scanning microscope, the detector having an SP module placed in front of it.

FIG. 1 schematically shows the exemplary embodiment of a confocal scanning microscope 100. This is not, intended to be construed as a limitation of the invention. Illuminating light beam 3 coming from at least one illumination system 1 is directed by a beam splitter or a suitable deflecting means 5 to a scanning module 7. Beam splitter 5 is advantageously implemented as an acoustooptical component (AOBS), since this dramatically improves overall optical performance. Before illuminating light beam 3 strikes deflection means 5, it passes through an illumination pinhole 6. Scanning module 7 encompasses a gimbal-mounted scanning mirror 9 that guides illuminating light beam 3, through a scanning optical system 12 and a microscope optical system 13, over or through a specimen 15. Illumination system 1 can be embodied in such a way that it generates white light from the light of a laser. A microstructured element 8 or a tapered glass fiber is provided for this purpose. The assemblage for generating white light is described in more detail in FIG. 3. In the case of nontransparent specimens 15, illuminating light beam 3 is guided over the specimen surface. With biological specimens 15 (preparations) or transparent specimens, illuminating light beam 3 can also be guided through specimen 15. For that purpose, non-luminous preparations can, if applicable, be prepared using a suitable dye (not depicted because established existing art). The dyes present in specimen 15 are excited by illuminating light beam 3 and emit light in a region of the spectrum characteristic of them. This light proceeding from specimen 15 defines a detected light beam 17. The latter travels through microscope optical system 13 and scanning optical system 12 and via scanning module 7 to deflection means 5, passes through the latter, and arrives via a detection pinhole 18 at a detection unit. In a particular embodiment, the detection unit encompasses at least one detector 36, 37 that is embodied as a photomultiplier. It is clear to one skilled in the art that other detection components, for example diodes, diode arrays, photomultiplier arrays, CCD chips, or CMOS image sensors, can also be used. Detectors 36 and 37 are spectrally configurable so that various selectable wavelength regions of detected light beam 17 can thereby be determined. Detected light beam 17 proceeding from or defined by specimen 15 is depicted in FIG. 1 as a dashed line. Electrical detected signals proportional to the power level of the light proceeding from specimen 15 are generated in detectors 36, 37. Because, as already mentioned above, light of only one wavelength is emitted from specimen 15, it is useful to provide an SP module 20 in front of the at least one detector 36, 37. The data generated by the at least one detector 36, 37 are forwarded to a computer system 23. At least one peripheral 27 is associated with computer system 23. The peripheral can be, for example, a display on which the user receives instructions for setting scanning microscope 100, or on which he or she can view the present setup and also the image data in graphical form. Also associated with computer system 23 is an input means that comprises, for example, a keyboard, an electronic setting apparatus for the components of the microscope system, and a mouse. SP module 20 (FIG. 2) is embodied in such a way that it can acquire a complete lambda scan, i.e. all the wavelengths proceeding from specimen 15 are recorded. The data are transferred to computer system 23 and can then be displayed on the display (not depicted) in a manner definable by the user. Detected light beam 17 is spatially spectrally divided using a prism 31. A further possibility for spectral division is the use of a reflection or transmission grating. The spectrally divided light fan 32 is focused with focusing optical system 33, and then strikes a mirror stop arrangement 34, 35. Mirror stop arrangement 34, 35, the means for spectral spatial division, focusing optical system 33, and detectors 36 and 37 are together referred to as SP module 20 (or the multiband detector).

Figure 2:
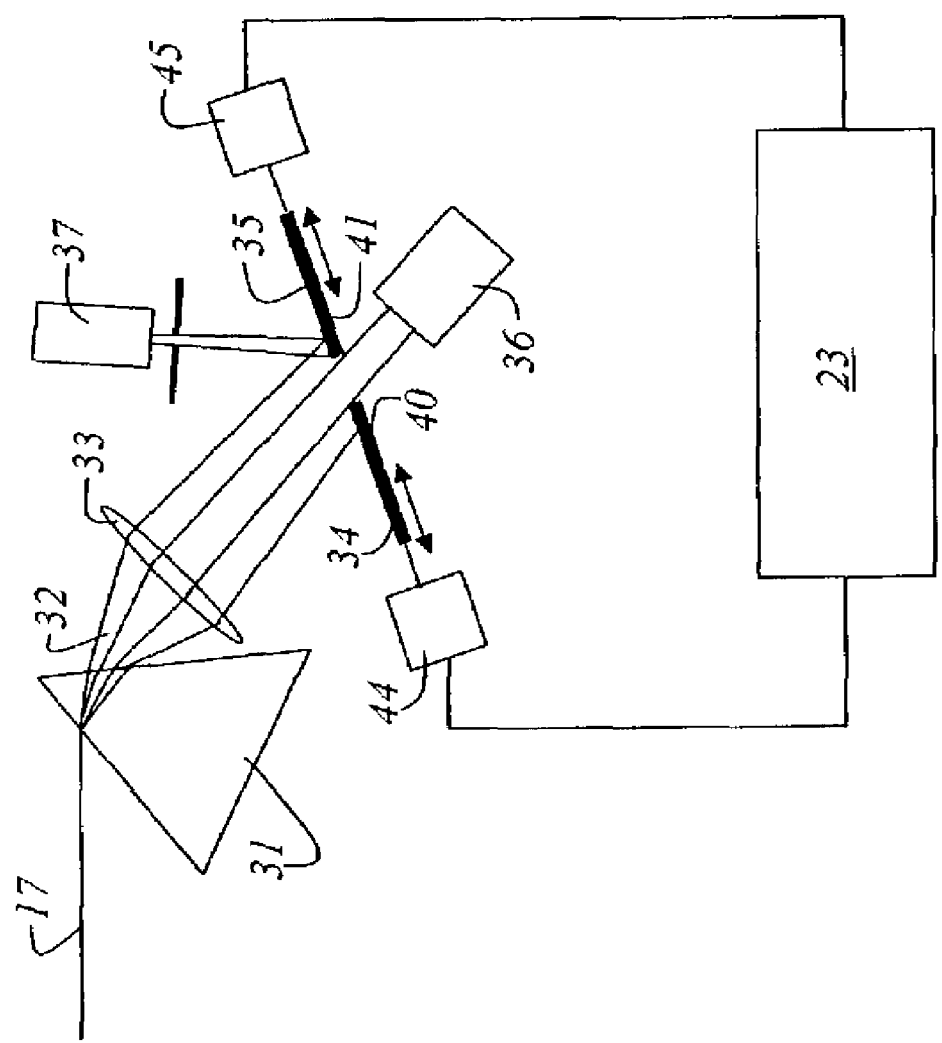
FIG. 2 schematically depicts the SP module in detail.

As is evident from FIG. 2, a desired portion of the spectrum can be systematically selected by means of mirror stop arrangement 34, 35. In the exemplary embodiment depicted here, slit stop arrangement 34, 35 is equipped with a first and a second slide 40 and 41. It is self-evident that for the selection of more than two spectral regions, a corresponding number of slides must be provided. A first motor 44 is associated with first slide 40, and a second motor 45 with second slide 41. Motors 44 and 45 cause a displacement, described in accordance with the method below, of slides 40 and 41. As a result of the displacement of slides 40 and 41, only a portion of the divided light fan 32 of detected light beam 17, which encompasses only light of the preselected spectral region, passes through mirror stop arrangement 34, 35 and is detected by detector 36, which is embodied as a photomultiplier. Another portion of the divided light fan 32 is reflected at mirror stop arrangement 35 and arrives at detector 37, which is also embodied as a photomultiplier.

Figure 3:
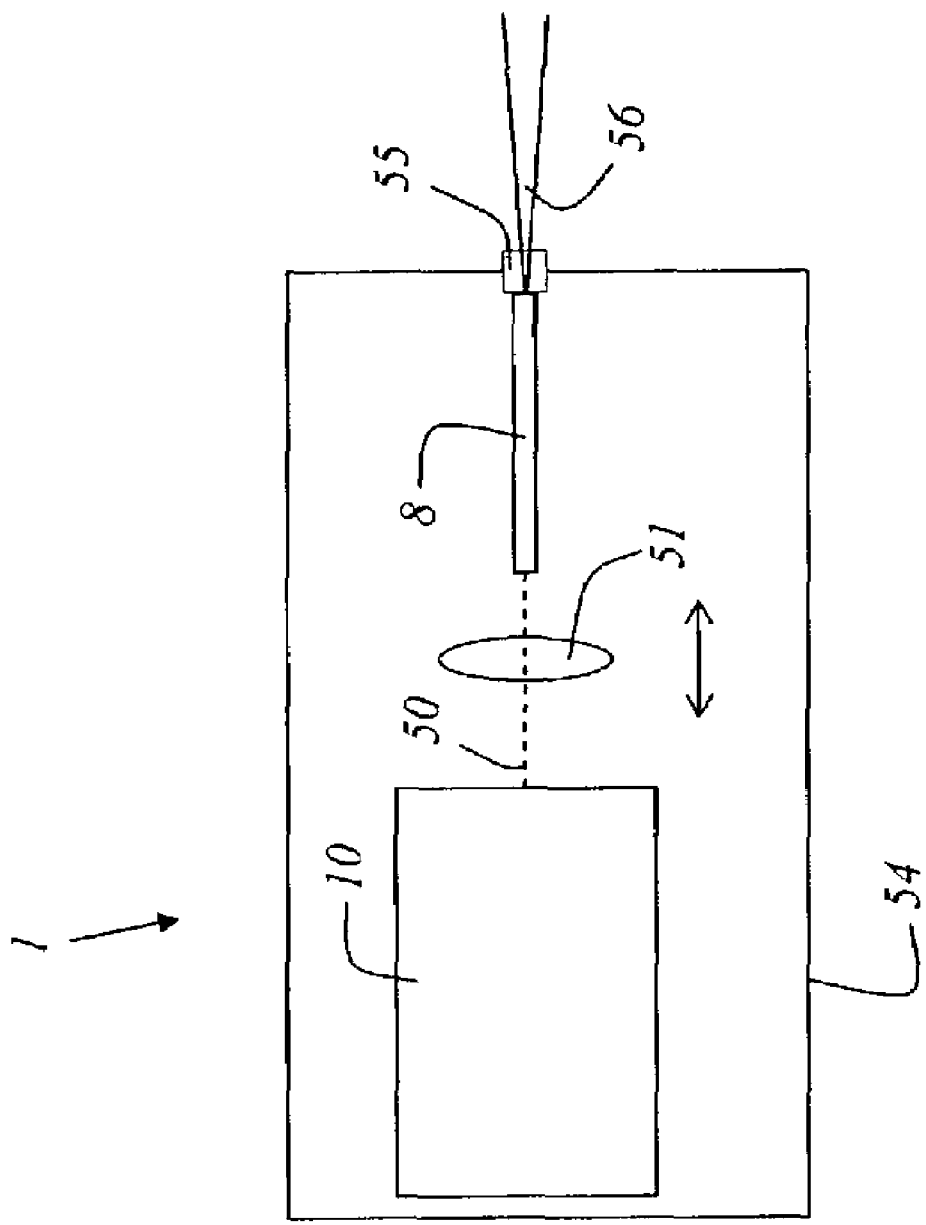
FIG. 3 shows a special white-light illumination system for a scanning microscope according to the present invention.

FIG. 3 shows illumination system 1, which contains a laser 10 that is embodied as a diode-laser-pumped, mode-coupled titanium-sapphire laser and emits a pulsed light beam 50 (corresponding to illuminating light beam 3 of FIG. 1) that is drawn with dashed lines. The duration of the light pulses is approx. 100 fs at a repetition rate of approx. 80

MHz. Light beam 50 is focused using focusing optical system 51, which is embodied as a zoom optical system and is arranged displaceably along the propagation direction of light beam 50, onto a microstructured optical element 8 that is made of a crystal of photonic band gap material. In microstructured optical element 8, the light of laser 10 is spectrally widened. All components are present in a housing 54 having a light exit opening 55 through which spectrally widened light 56 leaves the housing in the form of a divergent beam. The spectrum of spectrally widened light 56 extends from approx. 300 nm to 1600 nm, the light power level being largely constant over the entire spectrum. In an exemplary embodiment, microstructured optical element 8 can also comprise a light guide that has a cross-sectional taper. The emitted light of laser 10 is spectrally widened in the light guide. Illuminating light beam 3 (see FIG. 1) travels to deflection means 5, which is constituted by an acoustooptical element. The acoustooptical element is embodied as an acoustooptical tunable filter (AOTF), which limits illuminating light beam 3 in accordance with a band selected by the user that extends from $$\lambda - \frac{\Delta\lambda}{2}$$

to $$\lambda + \frac{\Delta\lambda}{2}.$$

Figure 4:
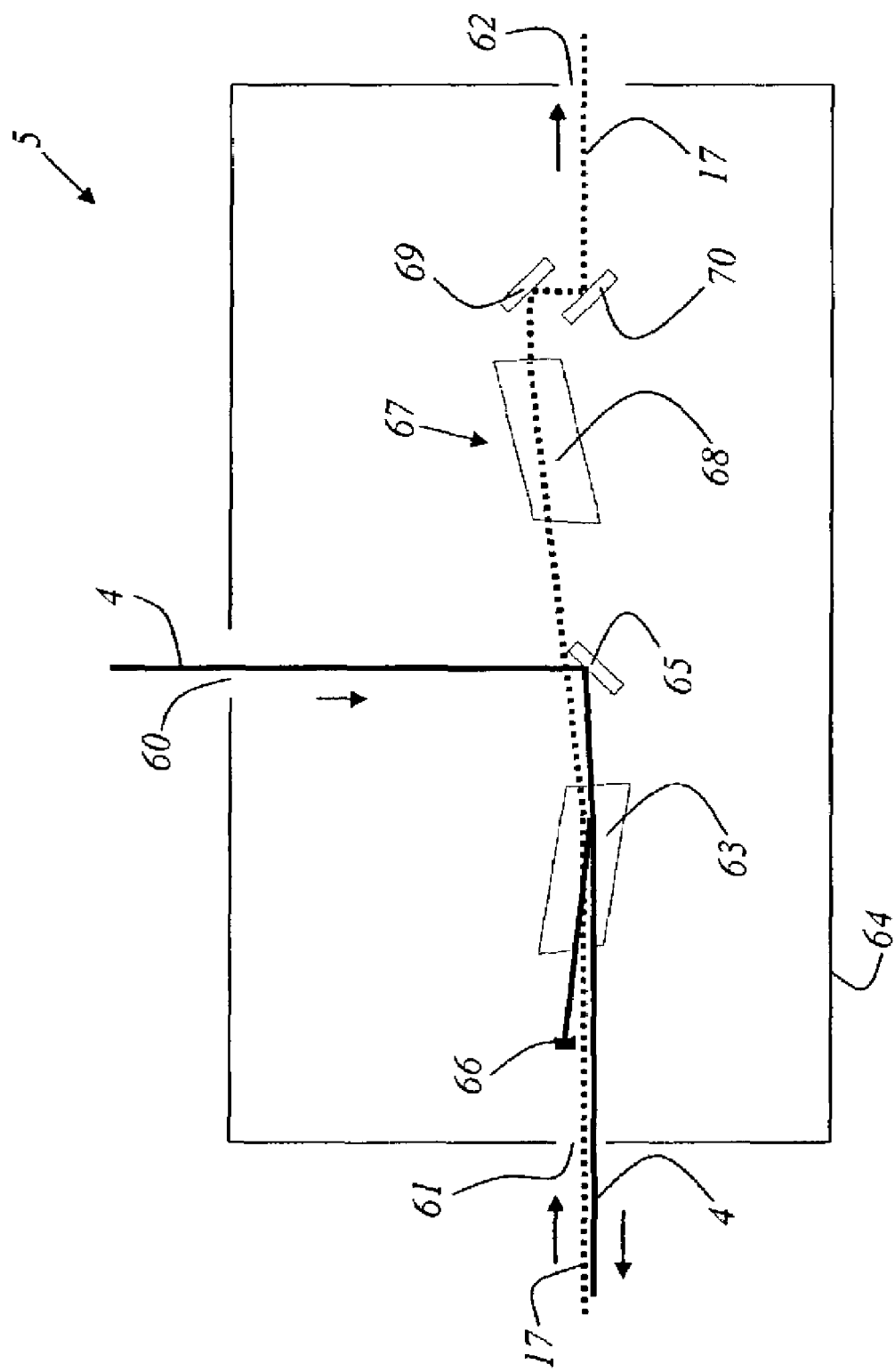
FIG. 4 shows an embodiment of an optical element that is provided for directing the illuminating light beam and the detected light beam.

FIG. 4 shows, in detail, optical deflection means 5 placed in front of SP module 20. Optical deflection means 5 has a first port 60, a second port 61, and a third port 62, illuminating light beam 4 being coupled into first port 60. At second port 61, illuminating light beam 4 is coupled out and a detected light beam 17 is coupled in. At third port 62, detected light beam 17 is coupled out and conveyed to SP module 20. Optical deflection means 5 contains a first acoustooptical component 63 and is configured as a replaceable module having a housing 64. The incident illuminating light beam 4 is directed by a deflecting mirror 65 onto first acoustooptical component 63. Acoustooptical component 63 is configured as an AOTF through which an acoustic wave passes. The acoustic wave is generated by an electrically activated piezoacoustic generator. The frequency of the acoustic wave is selected so that only those portions of illuminating light beam 4 having the desired wavelength are directed toward second port 61. The other portions of illuminating light beam 4 that are not influenced by the acoustic excitation are directed into a beam trap 66. The power level of the illuminating light beam 4 emerging from second port 61 can be selected by varying the amplitude of the acoustic wave; this is particularly advantageous especially for reflection-microscopy applications. The crystal sectioning and orientation of acoustooptical component 63 are selected in such a way that with the same incoupling direction, different wavelengths are deflected in the same direction.

Optical element 5 makes it possible to vary the power level of illuminating light beam 4, to vary the power level of at least one selectable wavelength or at least one selectable wavelength band of illuminating light beam 4, and also to completely block out selectable wavelengths or selectable wavelength bands. Detected light beam 17, which is depicted with dashed lines in FIG. 2 and in FIG. 4, strikes first acoustooptical component 63 in a propagation direction opposite to that of illuminating light beam 4. Those portions of detected light beam 17 having the same wavelength and polarization as illuminating light beam 4 are directed entirely or partially, depending on the amplitude of the acoustic wave, onto deflection mirror 65 and then to first port 60; at a reduced amplitude, the uninfluenced portion passes by deflection mirror 65. If detected light beam 17 is, for example, reflected light, optical element 5 then acts as a variable neutral beam splitter whose splitting ratio is determined by the amplitude of the acoustic wave. If detected light beam is fluorescent light whose wavelength is modified, for example, by Stokes or Raman shifting, it is not influenced by the acoustic wave and bypasses deflection mirror 65. Because of the double refraction of first acoustooptical component 63, detected light beam 17 is split into an ordinarily and an extraordinarily polarized beam. In addition, the ordinarily and extraordinarily polarized beams are also each spectrally spread because of the prismatic effect of acoustooptical component 63. An optical compensation element 67, which comprises a further acoustooptical component 68, is provided for compensation. Further acoustooptical component 68 corresponds in configuration to first acoustooptical component 63. It is arranged rotated 180 degrees about the beam axis with respect to first acoustooptical component 63. The spread-out partial beams of differing polarization directions are thereby combined again. At the same time, the spectral spreading of first acoustooptical component 63 is annulled. What remains at most is a slight parallel offset for detected light of different wavelengths. After passing through further acoustooptical component 67, detected light beam 17 strikes a mirror pair that is made up of a first mirror 69 and a second mirror 70. The mirror pair serves to bring detected light beam 17 into the desired beam axis, i.e. the beam axis exhibited by detected light beam 17 entering through second port 61. This simplifies the replaceability of optical deflection element 5 with an element having a conventional beam splitter. Like illuminating light beam 4, detected light beam 17 can similarly be varied in terms of power level in spectrally selective fashion, using first acoustooptical component 63 or also with further acoustooptical component 68.

Using the microscope architecture so far described and the architecture equivalent thereto (e.g. white-light source embodied as an arc lamp, spectral subdivision of the excitation light using prisms and mirror slides and zoom optics), the fluorescent properties of the dyes introduced into specimen or sample 15 can be optimally detected.

The problem can be explained with reference to FIGS. 5a and 5b. The dyes are characterized substantially by a graphical depiction 1000 of at least one absorption spectrum. In graphical depiction 1000 of the absorption spectrum, wavelength $\lambda$ is plotted on the abscissa and absorption coefficient $\alpha$ on the ordinate. A first and a second absorption spectrum 1001 and 1002 are characterized by the formula $\alpha_i(\lambda^{ex})$, where index i refers to the i-th dye introduced into the specimen. FIG. 5b shows a graphical representation 1100 of an emission spectrum. In graphical depiction 1100 of the emission spectrum, wavelength $\lambda$ is plotted on the abscissa and emission coefficient $\epsilon$ on the ordinate. A first and a second emission spectrum 1101 and 1102 are characterized by the formula $\epsilon_i(\lambda^{em})$, where index i references the i-th dye introduced into the specimen. The distinction between wavelengths $\lambda^{ex}$ and $\lambda^{em}$ is necessary because $\lambda^{ex}$ refers to light in the illumination beam path and $\lambda^{em}$ to light in the detection beam path. Both types of spectrum model the probability that a photon activity occurs in the dye and is statistical in nature. The absorption spectrum describes the probability that a photon will be captured by the dye, that an internal electron state will change, and that the energy of the molecule will be elevated. The emission spectrum describes the probability that an internal energy state results in an emission of light. In real dyes these spectra are relatively similar, reflection of the one spectrum about a characterized point usually yielding, approximately, the other spectrum. This reflection is not, however, to be construed as mathematically exact, but is merely a pseudo-rule that gives good heuristic service when applied to dyes. In addition, changes to the spectrum are observed that must be considered in relation to the biochemical environment of the specimen (e.g. local pH values).

A complete spectrum (absorption and emission spectrum) can then be defined using the function $$\chi_i(\lambda^{ex}, \lambda^{em}),$$

which is referred to hereinafter as the excitation-emission transfer spectrum. This function describes the fluorescent light of a dye that is excited at $\lambda^{ex}$ and detected at $\lambda^{em}$. If the prevailing approximate model is used, the following is obtained as a first approximation of this function:

$$\chi_i(\lambda^{ex}, \lambda^{em}) \approx \alpha_i(\lambda^{ex}) \epsilon_i(\lambda^{em}).$$

which is sufficient in most cases, but also often is not.

The substantial disadvantage of the existing art is that differences in the absorption spectra are not utilized, but instead the conclusions as to microscopic structure are drawn only on the basis of the emission spectra $\epsilon_i(\lambda^{em})$. This is depicted in FIGS. 6a and 6b. When first and second absorption spectra 1001 and 1002 are closely spectrally adjacent, and when first and second emission spectra 1101 and 1102 are closely spectrally adjacent, laser light is usually used for illumination. Illumination using laser light is depicted in the Figures which follow as a lightning bolt 1003. The laser light used for illumination possesses a specific wavelength whose location is represented by dashed line 1004 in graphical depiction 1000 of the absorption spectrum in FIG. 6a. FIG. 6b depicts acquisition of the emission spectrum. In the various scan intervals 1103 of the emission spectrum, the mixture of all colors is acquired. This measurement can be performed both as a spectral scan (more than four scan intervals) or as a multicolor image (e.g. one image per dye). Specific scan intervals 1105, 1106, and 1107 are depicted as gray-shaded areas. In FIG. 6b, the signal components that are employed in order to discriminate first and second emission spectra 1101 and 1102 are shown with hatching. If first and second emission spectra 1101 and 1102 are farther apart, more laser lines may be used for illumination, but the rest of the method remains unchanged. In this case the wavelength of the illuminating light is essentially modified only so that the absorption spectrum can in fact be hit.

The central idea of the invention is founded on direct acquisition of images based on $\chi_i(\lambda^{ex}, \lambda^{em})$. To achieve this, wavelength $\lambda^{ex}$ of the illumination, and wavelength regions $\lambda^{em}$ of the detection bands, are varied in controlled fashion in order to obtain optimal discrimination of the dyes introduced into the specimen. The use of a white-light source having a mechanism for spectral selection of the broad-band illumination system 1 allows complete acquisition of the function $\chi_i(\lambda^{ex}, \lambda^{em})$, making possible accurate predictions regarding dye combinations. FIG. 7a shows illumination of the specimen with a first wavelength that is depicted by dashed line 1004 in graphical depiction 1000 of the absorption spectrum in FIG. 7a. Also shown is illumination of the specimen with a second wavelength that is depicted by dashed line 1006 in the absorption spectrum. Illumination with the first wavelength generates an entirely different spectral response than illumination with the second wavelength. It is self-evident that the illumination need not be limited to two different wavelengths. FIG. 7b depicts the result of a scan of a first and a second emission spectra 1101 and 1102. Excitation of the specimen with the laser light depicted by lightning bolt 1005 (see FIG. 7a) yields first emission spectrum 1101 in FIG. 7b, which is characterized by the same shading as lightning bolt 1005. Excitation of the specimen with the laser light depicted by lightning bolt 1003 (see FIG. 7a) likewise results in second emission spectrum 1102 in FIG. 7b, which is characterized by the same shading as lightning bolt 1003. By sequential execution using systematic scans (regular scan points and constant scan interval widths, on both the excitation and emission side) and with simultaneous shifting of the illumination wavelengths, it is possible to scan for each individual pixel a function $I(\lambda^{ex}, \lambda^{em})$ that contains all the properties of the fluorescent dye and is directly proportional to $\chi_i(\lambda^{ex}, \lambda^{em})$.

FIG. 8 depicts the various illumination and detection bands for two different dyes. Illumination wavelength $\lambda^{ex}$ is plotted on the ordinate, and emission wavelength $\lambda^{em}$ on the abscissa. The necessary accuracy with which these functions are scanned depends on the experiment, and results in a variation in illumination and detection bands 1203 and 1204, although the central idea of the invention remains unaffected. Since illumination wavelength $\lambda^{ex}$ and emission wavelength $\lambda^{em}$ are wavelength regions, illumination and detection bands 1203 and 1204 are represented as areas in FIG. 8. If $\chi_i(\lambda^{ex}, \lambda^{em})$ is known, illumination and detection bands 1203 and 1204 can be selected so as to optimize differentiation of the dyes. This is done, as a function of the actual microscope configuration (number of detectors, etc.), by determining a set of areas on the $(\lambda^{ex}, \lambda^{em})$ plane whose edges define illumination and detection bands 1203 and 1204. In the exemplary embodiment depicted here, a first dye in the specimen having a first transfer spectrum 1201, and a second dye in the specimen having a second transfer spectrum 1202, are depicted. Depending on the dye information known a priori (first and second transfer spectra 1201 and 1202), it is possible to define as a function of the dyes an irregular pattern of scan rectangles within the emission-absorption plane that already provide enough information to distinguish among the specimens and dyes. As a first heuristic for allocating these detection configurations for two-dye situations, differences in emission and absorption spectra can be determined and then subjected to a threshold test. It is thereby possible to determine continuous spectral regions on the emission and absorption axes that provide maximum information yield for discriminating among dyes. In the case of multiple dyes, similar algorithms can be derived on the basis of linear algebra and statistical discriminance analysis, simultaneously modeling the mixing behavior on the emission and excitation sides and furnishing optimum settings. The principle is the same; only the underlying mathematical formalism is somewhat more complex and extensive.

A particular type of system configuration is obtained if the object of interest is entirely scanned, i.e. if the function $\chi_i(\lambda^{ex}, \lambda^{em})$ is completely scanned with sufficient accuracy. The illumination and detection bands can then, based on a numerical algorithm, be set so that they are optimal. Approaches to this include methods based on entropy or discriminance analysis which weight the areas under the rectangles, the areas being optimized in terms of the quality thereby defined.

Special data depictions in the form of an image or a two-dimensional plot (as is usual in material studies) are also useful as a way of displaying the acquired $\chi_i$ ($\lambda^{ex}$, $\lambda^{em}$) data to the experimenter.

The data thus obtained are highly suitable for further processing using decorrelation algorithms (as disclosed in U.S. Pat. No. 5,791,024), since such algorithms optimally filter out additional data and suppress redundant information.

The invention has been described with reference to a particular embodiment. It is self-evident, however, that changes and modifications can be made without thereby leaving the range of protection of the claims below. The invention has also been described for the simplified case of two spectra, it being sufficiently clear to one skilled in the art that the true value of the invention is obtained for more dyes.

The invention claimed is:

1. A method for data acquisition using a spectral scanning microscope, comprising the following steps:
   a) generating an illuminating light beam having a white light spectrum by propagating laser light from a laser source through a microstructured element and spectrally widening the laser light, the illuminating light beam having a continuous white light region;
   b) selecting a continuous illumination wavelength subregion from the continuous wavelength region of the illuminating light;
   c) setting a detection unit to a selceted detection wavelength subregion;
   d) performing an image or volume acquisition process and obtaining acquired image data;
   e) analyzing the acquired image data by means of a data analysis algorithm and obtaining analyzed data;
   f) determining a transfer spectrum $\chi_i$ ($\lambda^{ex}$, $\lambda^{em}$) for a pixel in the analyzed data; and
   g) using the transfer spectrum to adjust the illumination wavelength subregion and the detection wavelength subregion for subsequent data acquisition.

2. The method for data acquisition using a spectral scanning microscope as defined in claim 1, wherein a selection of a continuous wavelength subregion from the continuous wavelength region of the illuminating light; and a setting of the detection unit to the selected wavelength subregion is carried out by the user.

3. The method for data acquisition using a spectral scanning microscope as defined in claim 1, wherein a selection of a continuous wavelength subregion from the continuous wavelength region of the illuminating light and a setting of the detection unit to the selected wavelength subregion is carried by a computer algorithm.

4. The method for data acquisition using a spectral scanning microscope as defined in claim 3, comprising the following steps:
   a) systematically modifying the wavelength subregions employed for illumination;
   b) carrying out a point, line, image, or volume acquisition process;
   c) reconstructing, pixel by pixel, the transfer spectrum $\chi_i$ ($\lambda^{ex}$, $\lambda^{em}$);
   d) visualizing the transfer spectrum $\chi_i$ ($\lambda^{ex}$, $\lambda^{em}$).

5. The method for data acquisition using a spectral scanning microscope as defined in claim 3, comprising the following steps:
   a) sequentially acquiring the transfer spectrum $\chi_i$ ($\lambda^{ex}$, $\lambda^{em}$) of individual dyes;
   b) storing the acquired transfer spectrum $\chi_i$ ($\lambda^{ex}$, $\lambda^{em}$) in a memory, a database, or a file; and
   c) determining an optimum illumination and at least one detection region by using a computer algorithm.

6. A spectral scanning microscope comprising:
   an illumination system for generating an illuminating light beam comprsing a laser source designed to emit laser light in a direction of the illuminating light beam, a microstructured element disposed alone the illuminating light beam, the laser light propagating through a microstructured element and spectrally widening to a spectrum of white light and a continuous while light region when the microscope is in operation;
   a computer system and a memory with a database comprising a transfer spectrum $\chi_i$ ($\lambda^{ex}$, $\lambda^{em}$) for a pixel stored in the computer system;
   spectral selection means of the illuminating light beam for selecting a continuous wavelength subregion from a continuous wavelength region based on the transfer spectrum $\chi_i$ ($\lambda^{ex}$, $\lambda^{em}$); and
   at least one spectrally configurable detector along a detected light beam for selecting a detection band from the detected light beam based on the transfer spectrum $\chi_i$ ($\lambda^{ex}$, $\lambda^{em}$).

7. The spectral scanning microscope as defined in claim 6, wherein the laser light is emitted as a pulsed light beam; and the pulsed light beam is coupled into a microstructured optical element.

8. The spectral scanning microscope as defined in claim 7, wherein the microstructured optical element is made of photonic band gap material.

9. The spectral scanning microscope as defined in claim 7, wherein the microstructured optical element comprises a light guide that has a cross-sectional taper.

10. The spectral scanning microscope as defined in claim 6, wherein the means for spectral selection is an AOTF.

11. The spectral scanning microscope as defined in claim 6, wherein the at least one spectrally configurable detector is an SP module.

12. The spectral scanning microscope as defined in claim 6, wherein the spectrally configurable detector comprises a grating and a multi-channel PMT.

* * * * *